United States Patent [19]

Inouye et al.

[11] Patent Number: 4,965,333

[45] Date of Patent: Oct. 23, 1990

[54] RTV ORGANOPOLYSILOXANE COMPOSITIONS

[75] Inventors: Yoshio Inouye, Annaka; Takeo Inoue, Yokohama; Koji Yokoo, Tomioka, all of Japan

[73] Assignee: Shin-Etsu Chemical Co., Ltd., Tokyo, Japan

[21] Appl. No.: 286,735

[22] Filed: Dec. 20, 1988

[30] Foreign Application Priority Data

Dec. 21, 1987 [JP] Japan .................................. 62-323615

[51] Int. Cl.$^5$ ............................................ C08G 77/04
[52] U.S. Cl. ...................................... 528/33; 528/901; 528/18; 528/17; 528/19; 528/15; 528/16; 528/21; 528/22; 528/23; 528/14
[58] Field of Search ...................... 528/901, 33, 18, 17, 528/19, 15, 16, 21, 22, 23, 14

[56] References Cited

U.S. PATENT DOCUMENTS

| | | | |
|---|---|---|---|
| 4,695,617 | 9/1987 | Inoue et al. | 528/901 |
| 4,721,766 | 1/1988 | Inoue et al. | 528/901 |
| 4,734,479 | 3/1988 | Inoue et al. | 528/901 |

*Primary Examiner*—Melvyn I. Marquis
*Assistant Examiner*—Karen A. Hellender
*Attorney, Agent, or Firm*—Birch, Stewart, Kolasch & Birch

[57] ABSTRACT

A room temperature vulcanizable organopolysiloxane composition is provided, comprising (a) a diorganopolysiloxane blocked with a silanol, dialkoxy or trialkoxy radical at both ends of the molecular chain thereof, (b) a novel organic silicon compound of the general formula:

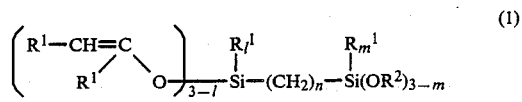

wherein $R^1$ is hydrogen or a monovalent hydrocarbon radical having 1 to 8 carbon atoms,

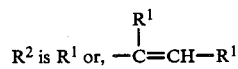

m and l are independently equal to 0, 1 or 2, and n is an integer in the range of 2 to 8, and (c) a curing catalyst. The composition may further contain (d) an organoalkoxysilane.

6 Claims, 1 Drawing Sheet

RTV ORGANOPOLYSILOXANE COMPOSITIONS

BACKGROUND OF THE INVENTION

1. Field of the Invention

This invention relates to room temperature vulcanizable organopolysiloxane compositions. More particularly it relates to RTV organopolysiloxane compositions having improved shelf life and satisfactory curing and bonding properties for use as electric and electronic part adhesives.

2. Prior Art

A variety of room temperature vulcanizable (RTV) organopolysiloxane compositions are known in the art. Among these, organopolysiloxane compositions comprising a hydroxyl-endblocked organopolysiloxane, a curing agent such as methyltrimethoxysilane, and a catalyst such as an organic titanium compound or organic titanium chelate are widely used as adhesives in the electric and electronic industry fields. These compositions do not give off corrosives or stimulating odors because they cure into a rubbery organopolysiloxane while generating an alcohol.

These RTV organopolysiloxane compositions of the dealcoholysis type, however, have drawbacks of slow curing, poor internal curing and shelf stability. They often do not cure upon actual use after extended shelf storage, even under anhydrous conditions.

It is proposed to improve the curing properties and shelf stability of RTV siloxane compositions by adding thereto a silane compound having a dialkoxy group as a silane scavenger.

This method is successful in improving the shelf stability of RTV siloxane compositions only by substituting a reactive amide or amine group for a hydrolyzable group other than the dialkoxy group of the silane compound. Substitution of a reactive amide or amine group for a hydrolyzable group results in RTV siloxane compositions which generate toxic or corrosive gases upon curing, causing rust on the surface of a subject in contact therewith. Therefore, these compositions could not find application as adhesives in the electric and electronic industry fields.

Therefore, there is a need for a room temperature vulcanizable organopolysiloxane composition of quality having satisfactory curing properties and shelf stability.

SUMMARY OF THE INVENTION

An object of the present invention is to provide a room temperature vulcanizable organopolysiloxane composition having improved shelf stability as well as satisfactory curing and bonding properties and is suitable for use as an adhesive for electric and electronic parts.

According to the present invention, there is provided a room temperature vulcanizable organopolysiloxane composition comprising (a) a diorganopolysiloxane blocked with a silanol, dialkoxy or trialkoxy radical at both ends of the molecular chain thereof, (b) an organic silicon compound of the general formula:

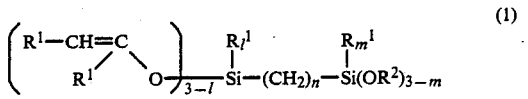

wherein $R^1$ is hydrogen or a monovalent hydrocarbon radical having 1 to 8 carbon atoms,

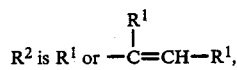

m and l are independently equal to 0, 1 or 2, and n is an integer in the range of 2 to 8, and (c) a curing catalyst.

The room temperature vulcanizable organopolysiloxane composition of the present invention has an increased shelf life and improved curing and bonding properties. Even after extended storage, the composition quickly cures upon exposure to air without giving off corrosive or toxic gases, providing a cured product having improved physical and bonding properties. Since the composition adheres well to any electric part substrates, it is advantageously used as an adhesive for electric and electronic parts.

BRIEF DESCRIPTION OF THE DRAWINGS

The above and other objects, features, and advantages of the present invention will be better understood from the following description taken in conjunction with the accompanying drawings, in which.

DETAILED DESCRIPTION OF THE INVENTION

Figure 1:
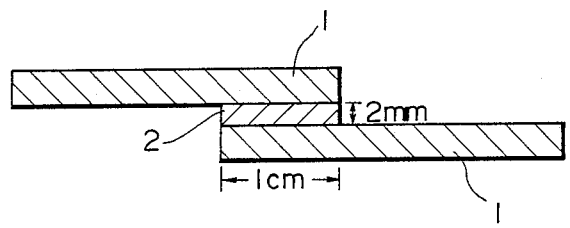
FIGS. 1 and 2 are respectively a cross section and a plan view showing a test piece of adhesive bonded adherends for use in the measurement of shear bond strength.

Investigating prior art conventional RTV organopolysiloxane compositions of the dealcoholysis type having blended therein a silane scavenger having a dialkoxy group, the present inventors have found that these compositions have poor shelf stability and curing properties because the alkoxy group of the silane compound is less reactive with a hydroxyl group of the organopolysiloxane and water contents of a filler, if any, so that the unreacted silanol and an alcohol resulting from the alkoxy groups are left in the composition. We have found that by blending (b) a novel organic silicon compound of formula (1) to a room temperature vulcanizable organopolysiloxane composition comprising (a) an organopolysiloxane and (c) a curing catalyst as defined above, any unreacted silanol and resultant alcohol will be completely removed from the composition. The resulting room temperature vulcanizable organopolysiloxane composition exhibits improved curing and bonding properties as well as shelf stability. Advantageously, the composition exhibits improved adherence, particularly to electric part substrates including polycarbonates.

Briefly stated, the present invention provides an RTV composition comprising (a) a diorganopolysiloxane blocked with a silanol, dialkoxy or trialkoxy radical at both ends of its molecular chain, (b) an organic silicon compound of the general formula (1) defined above, and (c) a curing catalyst.

In one preferred embodiment of the present invention, the composition further contains (d) an organoalkoxysilane of the general formula:

$$R^3{}_{4-b}Si(OR^4)_b \quad (2)$$

wherein
$R^3$ is a monovalent hydrocarbon radical,
$R^4$ is an alkyl radical or an alkyl radical having an alkoxy substituent, and
b is equal to 3 or 4,
or a partial hydrolyzate thereof.

The invention will be described in further detail.

Base component (a) blended in the RTV composition of the present invention is a diorganopolysiloxane blocked with a silanol or dialkoxy or trialkoxy radical at both ends of its molecular chain.

Component (a) or diorganopolysiloxane includes a number of siloxane compounds falling in the above-defined scope. Preferred are those diorganopolysiloxanes of the following average compositional formula:

$$R_aSiO_{(4-a)/2} \quad (3)$$

which are blocked with a silanol or dialkoxy or trialkoxy radical at both ends of their molecular chain. In the formula, R is hydrogen or a monovalent substituted or unsubstituted hydrocarbon radical selected from the group consisting of alkyl radicals such as methyl, ethyl, propyl, butyl, 2-ethylbutyl, and octyl radicals; cycloalkyl radicals such as cyclohexyl and cyclopentyl radicals; alkenyl radicals such as vinyl and hexenyl radicals; aryl radicals such as phenyl, tolyl, xylyl, naphthyl, and diphenyl radicals; aralkyl radicals such as benzyl and phenylethyl radicals; and modified ones of these radicals in which some or all of the hydrogen atoms attached to a carbon atom in the radical are replaced by a halogen atom or cyano radical, for example, chloromethyl, trifluoropropyl, 2-cyanoethyl, and 3-cyanopropyl radicals, R's may be the same or different, and a has a value in the range of from 1.90 to 2.05. Preferred R radicals are methyl and phenyl radicals.

The diorganopolysiloxane (a) preferably has a viscosity of at least 25 centistokes at 25° C. because blending of the diorganopolysiloxane with such a viscosity provides a composition with more improved rubbery elasticity and mechanical strength. The upper limit of viscosity may be about 1,000,000 centistokes.

If desired, in addition to diorganopolysiloxane (a), there may be blended a diorganopolysiloxane whose molecular chain is endcapped with a radical other than the hydroxyl, dialkoxy, and trialkoxy radicals, for example, a trimethylsilyl radical. This being the case, the diorganopolysiloxane endcapped with a radical other than the hydroxyl, dialkoxy, and trialkoxy radicals is preferably blended in an amount at most equal to the amount of diorganopolysiloxane (a) blended.

Component (b) of the RTV composition disclosed herein is a novel organic silicon compound of general formula (1) defined above. By blending the organic silicon compound of formula (1), not only unreacted silanol and liberated alcohol will be removed from the diorganopolysiloxane composition, but the adherence of the cured composition is improved. There is thus obtained an RTV composition having an extended shelf life as well as improved curing and bonding properties.

Preferred examples of the organic silicon compounds of formula (1) include compounds of the following formulae (4) to (6).

$$(CH_2\!=\!\underset{\underset{CH_3}{|}}{C}\!-\!O)_3SiC_2H_4Si(O\!-\!\underset{\underset{CH_3}{|}}{C}\!=\!CH_2)_2 \quad (4)$$

$$(CH_2\!=\!\underset{\underset{CH_3}{|}}{C}\!-\!O)_3SiC_2H_4Si(OCH_3)_3 \quad (5)$$

$$(CH_2\!=\!\underset{\underset{CH_3}{|}}{C}\!-\!O)_3SiC_2H_4Si(OC_2H_5)_2 \quad (6)$$

The organic silicon compounds of formula (1) may be used alone or in admixture of two or more. The amount of the compound of formula (1) blended is not particularly limited although it is preferably blended in an amount of about 0.1 to about 10 parts by weight per 100 parts by weight of component (a).

It is to be understood that the organic silicon compounds of formula (1) may be readily synthesized by an ordinary method, for example, by reacting a vinyltris(isopropenyloxy)silane of the formula:

$$(CH_2\!=\!\underset{\underset{CH_3}{|}}{C}\!-\!O)_3SiCH\!=\!CH_2 \quad (7)$$

with a trimethoxysilane of the formula:

$$HSi(OCH_3)_3 \quad (8),$$

methyldi(isopropenoxy)silane or methyldi(ethoxy)silane in the presence of a catalyst such as chloroplatinic acid to effect hydrosilylation.

The RTV composition disclosed herein also contains component (c) which is a curing catalyst.

Component (c) may be any desired one of curing catalysts commonly used in conventional RTV compositions. Exemplary curing catalysts are given below.

Tin carboxylates such as tin naphthenate, tin caprylate, and tin oleate;

organic tin compounds such as dibutyltin diacetate, dibutyltin dioctate, dibutyltin dilaurate, dibutyltin dioleate, diphenyltin diacetate, dibutyltin oxide, dibutyltin dimethoxide, dibutylbis(triethoxysiloxy)tin, dibutyltin dibenzylmaleate;

metal salts of organic carboxylic acids such as titanium naphthenate, zinc naphthenate, cobalt naphthenate, and zinc stearate;

organic titanates such as tetrabutyl titanate, tetra-2-ethylhexyl titanate, triethanolamine titanate, and tetra(isopropenyloxy) titanate;

organic titanium compounds such as organosiloxytitanium and β-carbonyltitanium;

alkoxy aluminum compounds;

aminoalkyl-substituted alkoxy silanes such as 3-aminopropyltriethoxysilane, N-(trimethoxysilylpropyl)ethylenediamine;

amines and salts thereof such as hexylamine and dodecylamine phosphate; quaternary ammonium salts such as benzyl triethylammonium acetate;

alkali metal salts of lower fatty acids such as potassium acetate, sodium acetate, and lithium oxalate;

dialkylhydroxylamines such as dimethylhydroxylamine and diethylhydroxylamine;

silanes and siloxanes containing a tetraalkylguanidyl group of the following formulae (9) to (14):

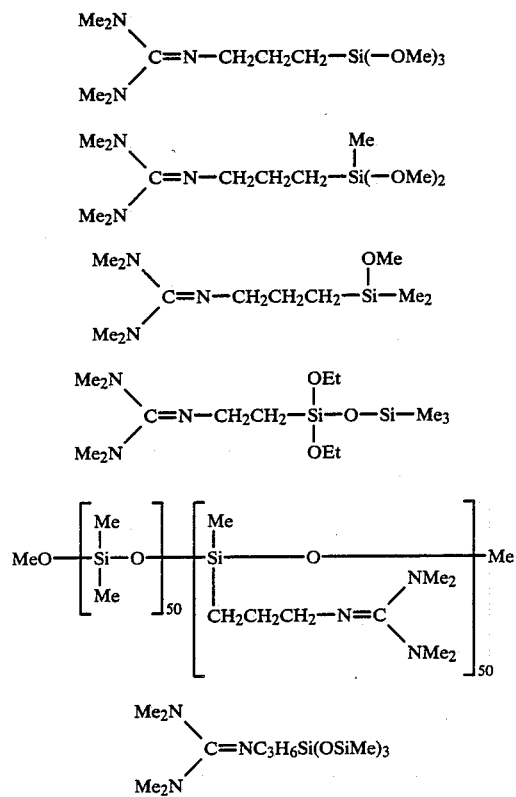

In formulae (9) to (14), Me is methyl, Et is ethyl, Pr is propyl, and Ph is phenyl.

The most preferred curing catalyst is dibutyltin dioctate.

The curing catalyst is preferably blended in an amount of about 0.01 to about 5 parts by weight, more preferably about 0.1 to about 1 part by weight per 100 parts by weight of component (a). There is the possibility that less than about 0.01 part by weight of the curing catalyst will be insufficient to catalyze curing whereas the presence of more than about 5 parts by weight of the curing catalyst will result in cured silicone rubber with deteriorated heat resistance.

In one preferred embodiment, the RTV composition of the present invention includes (d) an organoalkoxysilane of the general formula:

$$R^3{}_{4-b}Si(OR^4)_b \quad (2)$$

or a partial hydrolyzate thereof in addition to components (a) to (c).

In the formula, $R^3$ is a monovalent hydrocarbon radical having 1 to 8 carbon atoms, preferably 1 to 6 carbon atoms, $R^4$ is an alkyl radical or an alkyl radical having an alkoxy substituent in which the alkyl radical should preferably have 1 to 8 carbon atoms, more preferably 1 to 5 carbon atoms and the alkoxy substituent should preferably have 1 to 5 carbon atoms, more preferably 1 to 3 carbon atoms, and b is equal to 3 or 4. Examples of the monovalent hydrocarbon radical represented by $R^3$ include methyl, ethyl, propyl, vinyl, phenyl and trifluoropropyl radicals. Examples of the radical represented by $R^4$ include alkyl radicals such as methyl, ethyl, propyl and butyl radicals, and alkoxy-substituted alkyl radicals such as methoxyethyl and ethoxyethyl radicals.

Illustrative, non-limiting examples of the organoalkoxysilane of formula (2) include methyltrimethoxysilane, methylethyltrimethoxysilane, vinyltrimethoxysilane, tetraethoxysilane, methyltriethoxysilane, ethyltrimethoxysilane, methyltriisopropoxysilane, phenyltrimethoxysilane, methyltri(methoxyethoxy)silane, phenyltri(methoxyethoxy)silane, vinyltri(methoxyethoxy)silane, tetra(ethoxyethoxy)silane, and trifluoropropyltrimethoxysilane. Most preferred are methyltrimethoxysilane, vinyltrimethoxysilane, phenyltrimethoxysilane, methyltri(methoxyethoxy)silane, and vinyltri(methoxyethoxy)silane. Instead of these organoalkoxysilanes, partial hydrolyzates thereof may also be used.

Component (d) or organoalkoxysilane of formula (2) may preferably be blended in an amount of up to about 30 parts by weight per 100 parts by weight of component (a). Higher contents of component (d) sometimes result in cured products having poor rubber elasticity and are detrimental to economy.

In addition to the above-mentioned components (a) to (d), the composition of the present invention may contain any of conventional additives depending on the intended application. Typical examples of the additives are reinforcing or extending fillers, for example, finely divided silica, silica aerogel, precipitated silica, diatomaceous earth, metal oxides such as iron oxide, zinc oxide and titanium oxide, or silane treated products of these fillers, metal carbonates such as calcium carbonate, magnesium carbonate and zinc carbonate, asbestos, glass wool, carbon black, finely crashed mica, fumed silica, finely divided synthetic resins such as polystyrene, polyvinyl chloride, and polypropylene. Other examples of the additives which may be added herein include thixotropic agents such as polyethylene glycol and its derivatives, dyes, pigments, anti-aging agents, antioxidants, antistatic agents, flame retardants such as antimony oxide and paraffin oxide, heat transfer modifiers such as boron nitride and aluminum oxide, adherence promotors, carbon functional silanes having such groups as amino, epoxy and thiol groups, metal salts of carboxylic acids, and metal alcolates. For ease of addition, these additives may be diluted with hydrocarbon solvents such as toluene and petroleum ether, and ketone and ester solvents before they are added to the composition.

The RTV compositions of the present invention are stable under sealed conditions, but rapidly cure into rubbery state upon exposure to air due to contact with water contents therein. They may be widely used as adhesives for electric and electronic parts, sealants to various materials, coating agents, water repellents, mold processing agents, and fiber treating agents. They give off no toxic or corrosive gases upon curing. They are particularly advantageous as adhesives for electric and electronic parts because they firmly adhere to substrates of such parts.

As described above, the room temperature vulcanizable organopolysiloxane composition of the present invention has an extended shelf life and improved curing and bonding properties so that it may rapidly cure into a cured product having improved physical properties and adherence upon exposure to air even after shelf stored for an extended period of time. Upon curing, the composition does not generate toxic or corrosive gases which will otherwise cause rust formation on the surface of an object in contact with the composition. Because of improved adherence to electric part substrates such as polycarbonate, the composition is particularly useful as adhesive for electric and electronic parts.

EXAMPLES

Examples of the present invention are given below by way of illustration and not by way of limitation.

First, examples of the synthesis of some organic silicon compounds of formula (1) are described.

Synthesis 1

A reactor was charged with 22.6 grams (0.1 mol) of vinytris(isopropenyloxy)silane, 0.01 gram of a solution of chloroplatinic acid in isopropanol (platinum content 1.0% by weight), and 50 grams of toluene. The contents of the reactor were heated to 65° C. while 15.8 grams (0.1 mol) of methyldi(isopropenoxy)silane was added dropwise over about 2 hours. The reaction was exothermic and completed at the end of dropwise addition. After completion of reaction, the reaction solution was distilled under vacuum, yielding 36.2 grams of a liquid product having a boiling point of 146° C under 5 mmHg.

The liquid product was analyzed to find that it is an organic silicon compound having the following structural formula (4) and physical properties.

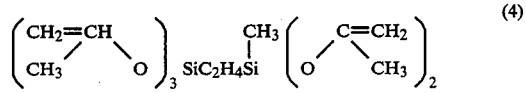
(4)

Specific gravity: 0.9792 at 25° C.
Refractive index: $n_D^{25} = 1.4500$
Molecular weight: 384 (based on gas mass spectrometry)

Synthesis 2

The procedure of Synthesis 1 was repeated except that the methyldi(isopropenoxy)silane was replaced by 12.2 grams (0.1 mol) of trimethoxysilane. There was yielded 30.5 grams of a liquid product having a boiling point of 141° C. under 8 mmHg.

The liquid product was analyzed to find that it is an organic silicon compound having the following structural formula (5) and physical properties.

(5)

Specific gravity: 1.0202 at 25° C.
Refractive index: $n_D^{25} = 1.4340$
Molecular weight: 348 (based on gas mass spectrometry)

Synthesis 3

The procedure of Synthesis 1 was repeated except that the methyldi(isopropenoxy)silane was replaced by 13.4 grams (0.1 mol) of methyldi(ethoxy)silane. There was yielded 32.3 grams of a liquid product having a boiling point of 147° C. under 11 mmHg.

The liquid product was analyzed to find that it is an organic silicon compound having the following structural formula (6) and physical properties.

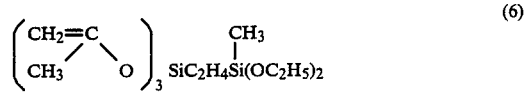
(6)

Specific gravity: 0.9639 at 25° C
Refractive index: $n_D^{25} = 1.4400$
Molecular weight: 360 (based on gas mass spectrometry)

EXAMPLES 1-6

To 88 parts by weight of a dimethylpolysiloxane endcapped with a silanol radical at both ends of its molecular chain having a viscosity of 20,000 centipoise at 25° C. were added 9 parts by weight of fumed silica surface treated with a trimethylsilyl group and 3 parts by weight of fumed silica surface treated with cyclic dimethylpolysiloxane. The ingredients were evenly milled to obtain base compound (A).

A series of RTV compositions having the formulation shown in Table 1 were prepared using base compound (A).

The resulting RTV compositions were measured for various physical properties and shear bond strength by the following methods.

Physical properties

An RTV composition as prepared was extruded into a sheet of 2 mm thick and then cured by allowing to stand for 7 days in air at a temperature of 23° C. and a relative humidity of 55%. The cured sheet was measured for hardness (according to JIS K-6301), elongation (%) and tensile strength (kgf/cm²). The results are properties of a fresh composition.

RTV composition samples of the same lot as above were contained in a sealed container and stored for 7 days at 70° C. and one year at 23° C. By following the same procedures as above, these samples were extruded into a sheet, cured at room temperature, and measured for the physical properties.

Shear bond strength

Figure 2:
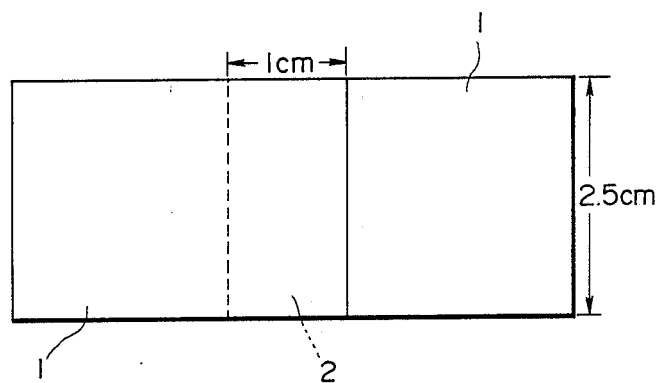

The test piece used herein is shown in the cross section and plan view of FIGS. 1 and 2. An RTV composition 2 was applied between overlapping areas (1 cm by 2.5 cm) of two adherends 1 and 1 (each 2.5 cm wide). The RTV composition layer having a thickness of 2 mm was then cured by allowing to stand for 7 days in air at a temperature of 23° C. and a relative humidity of 55%. The test piece was measured for shear bond strength using a tensile tester.

Three RTV composition samples of the same lot were used including a fresh one and two aged samples which had been stored in a sealed container for 7 days at 70° C. and one year at 23° C.

Three different adherends were used including those formed of glass, aluminum, and polycarbonate.

The results are shown in Table 1.

TABLE 1

|  | Examples | | | | | |
|---|---|---|---|---|---|---|
|  | 1 | 2 | 3 | 4 | 5* | 6* |
| Composition | | | | | | |
| Base compound A | 100 | 100 | 100 | 100 | 100 | 100 |
| Compound of formula (4) | 2 | — | — | — | — | — |
| Compound of formula (5) | — | 3 | — | 7 | — | — |
| Compound of formula (6) | 8 | — | 3 | — | — | — |
| Methyltrimethoxysilane | — | — | — | 3 | — | 6 |
| Vinyltrimethoxysilane | — | 8 | 7 | — | 8 | — |
| γ-aminopropyltriethoxysilane | 1 | 1 | 1 | 1 | 1 | 1 |
| Dibutyltin dioctate | 0.3 | 0.3 | 0.3 | 0.3 | 0.3 | 0.3 |
| γ-guanidinopropyltris(trimethylsiloxy)silane | 0.5 | 0.5 | 0.5 | 0.5 | 0.5 | 0.5 |
| Physical Properties | | | | | | |
| *Fresh sample* | | | | | | |
| Hardness (JIS) | 37 | 39 | 36 | 40 | 40 | 38 |
| Elongation (%) | 260 | 250 | 270 | 240 | 250 | 240 |
| Tensile strength (kg-f/cm$^2$) | 22 | 21 | 22 | 23 | 20 | 18 |
| *7-day aged sample* | | | | | | |
| Hardness (JIS) | 37 | 38 | 36 | 38 | Not cured | |
| Elongation (%) | 250 | 250 | 280 | 250 | into | |
| Tensile strength (kg-f/cm$^2$) | 21 | 20 | 22 | 22 | rubber | |
| *1-year aged sample* | | | | | | |
| Hardness (JIS) | 37 | 39 | 36 | 39 | 15 | 17 |
| Elongation (%) | 260 | 250 | 270 | 240 | 100 | 100 |
| Tensile strength (kg-f/cm$^2$) | 22 | 21 | 22 | 23 | 7 | 8 |
| Shear Bond Strength (kg-f/cm$^2$) | | | | | | |
| *Fresh sample* | | | | | | |
| Glass | 8.2 | 8.7 | 8.0 | 8.5 | 8.2 | 8.0 |
| Aluminum | 8.0 | 7.7 | 7.8 | 7.9 | 8.0 | 7.8 |
| Polycarbonate | 7.3 | 7.2 | 7.4 | 7.2 | 1.8 | 1.2 |
| *7-day aged sample* | | | | | | |
| Glass | 8.0 | 7.8 | 8.1 | 8.0 | Un- | |
| Aluminum | 7.9 | 7.7 | 7.7 | 7.8 | measurable | |
| Polycarbonate | 7.2 | 7.1 | 7.2 | 7.3 | | |
| *1-year aged sample* | | | | | | |
| Glass | 8.1 | 8.2 | 8.0 | 8.0 | 1.3 | 1.2 |
| Aluminum | 7.8 | 7.7 | 7.7 | 7.8 | 1.3 | 1.1 |
| Polycarbonate | 7.3 | 7.2 | 7.1 | 7.3 | 0 | 0 |

*outside the scope of the invention

As seen from the data of Table 1, room temperature vulcanizable compositions falling in the scope of the present invention, even after extended shelf storage, rapidly cure upon exposure to air into a cured product having improved physical properties and adherence. The present compositions exhibit improved shelf stability while maintaining curing and bonding properties. Good adherence of the present compositions to polycarbonate is also observed.

While the invention has been described in its preferred embodiments, obviously modifications and variations are possible in light of the above teachings. It is therefore to be understood that within the scope of the appended claims, the invention may be practiced otherwise than as specifically described.

What we claim is:

1. A room temperature vulcanizable organopolysiloxane composition comprising:
   (a) a diorganopolysiloxane blocked with a silanol, dialkoxy or trialkoxy radical at both ends of the molecular chain thereof,
   (b) an oragnic silicon compound of the general formula:

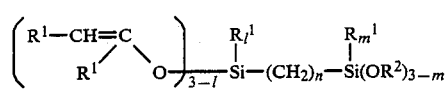     (1)

wherein $R^1$ is hydrogen or a monovalent hydrocarbon radical having 1 to 8 carbon atoms,

m and l are independently equal to 0, 1 or 2, and n is an integer in the range of 2 to 8, and (c) a curing catalyst.

2. The composition of claim 1 which contains
   (a) 100 parts by weight of the diorganopolysiloxane,
   (b) about 0.1 to about 10 parts by weight of the organic silicon compound of formula (1), and
   (c) about 0.01 to about 5 parts by weight of the curing catalyst.

3. The composition of claim 1 or 2 which further comprises
   (d) up to about 30 parts by weight of an organoalkoxysilane of the general formula:

$$R^3_{4-b}Si(OR^4)_b \qquad (2)$$

wherein
   $R^3$ is a monovalent hydrocarbon radical,
   $R^4$ is an alkyl radical or an alkyl radical having an alkoxy substituent, and
   b is equal to 3 or 4,
   or a partial hydrolyzate thereof per 100 parts by weight of diorganopolysiloxane (a).

4. The composition of claim 1 wherein the organic silicon compound of the component (b) is

5. The composition of claim 1 wherein the organic silicon compound of the component (b) is
6. The composition of claim 1 wherein the organic silicon compound of the component (b) is
* * * * *